Dec. 6, 1960 W. F. WILSDORF, SR 2,963,315
BUG DEFLECTOR FOR MOTOR VEHICLES
Filed Oct. 4, 1957
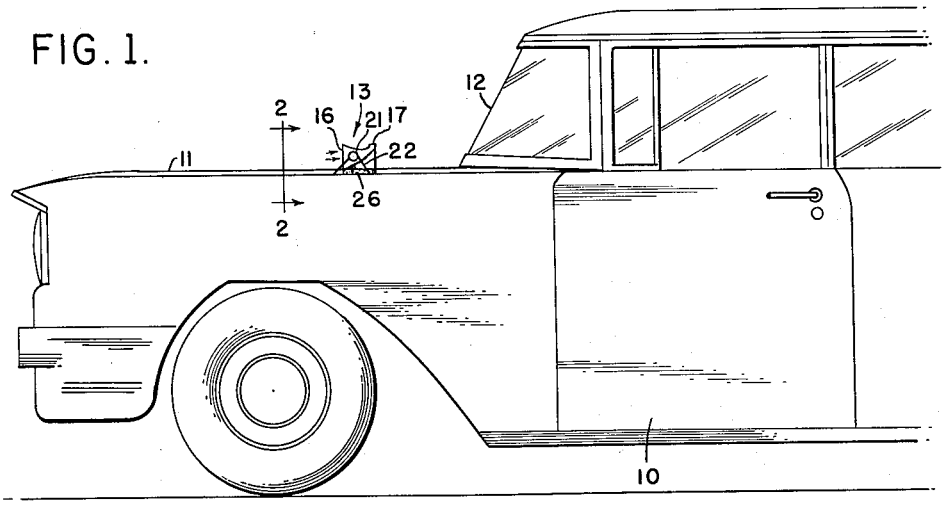
FIG. 1.
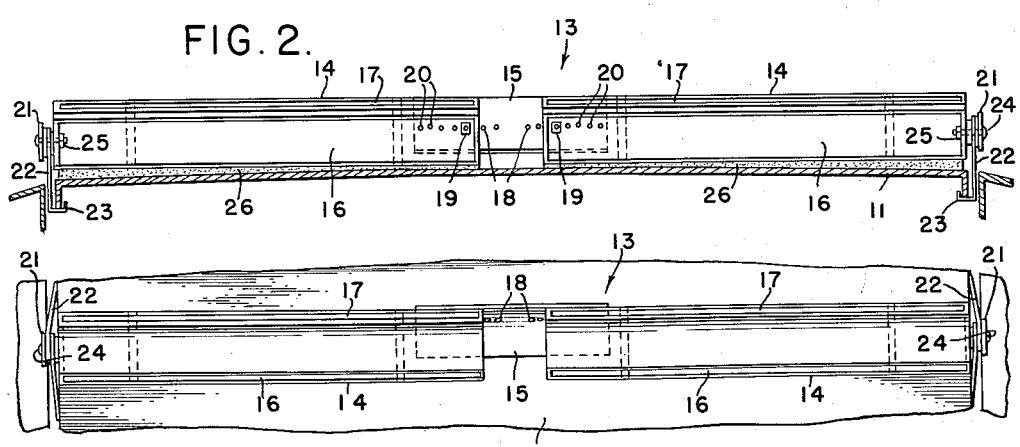
FIG. 2.
FIG. 3.
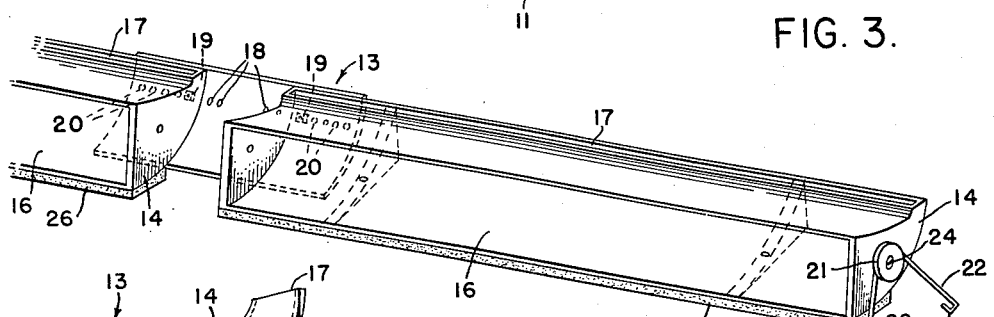
FIG. 4.
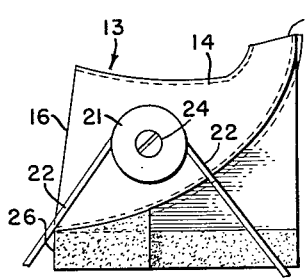
FIG. 5.
INVENTOR.
WALTER F. WILSDORF SR.
BY
*Garney & Garney*
ATTORNEYS United States Patent Office 2,963,315
Patented Dec. 6, 1960

2,963,315
BUG DEFLECTOR FOR MOTOR VEHICLES
Walter F. Wilsdorf, Sr., P.O. Box 361, Monticello, Ill.
Filed Oct. 4, 1957, Ser. No. 688,252
2 Claims. (Cl. 296—91)

This invention is a bug deflector for motor vehicles being especially adapted to intercept bugs of various miscellany, fore of the vehicle windshield, and blow them clear of the windshield.

Objects of this invention are to provide a bug deflector detachably engageable with a motor vehicle hood, fore of the windshield, the deflector being laterally adjustable for adaptation on vehicles of various widths; to provide a deflector which includes a funnel-like means in which the air is compressed before expulsion, which tests have shown will blow the bugs or insects over the roof of the vehicle; to provide a deflector which moves as a unit with the hood when the latter is raised and lowered; to provide a deflector which may be incorporated into the front bumper to prevent impingement of bugs with the radiator; and to provide a deflector mounted on top of the hood, with a conduit through which the air travels in the direction of movement of the vehicle, the outlet end of the conduit being coextensive with the width of the windshield to provide a stream of air over the entire windshield while the vehicle is in motion.

I am aware that many attempts have been made in this art to solve the problem of eliminating the crushing of bugs and insects on windshields, illustrative of which are the following: 1,726,395, Kishimoto, Aug. 27, 1929; 2,220,715, Heintz, Nov. 5, 1940; 2,223,378, Martin, Dec. 3, 1940.

Other objects of the invention will be manifest from the following description of the preferred form of the invention, taken in connection with the accompanying drawings, wherein:

Fig. 1 is an end elevational view of a deflector constructed in accordance with this invention, illustrating its application on a motor vehicle;

Fig. 2 is a vertical sectional view taken on the line 2—2 of Fig. 1, looking in the direction of the arrows;

Fig. 3 is a top plan view of the deflector illustrating its application;

Fig. 4 is a fragmentary perspective view of the deflector per se; and

Fig. 5 is an end elevational view of the deflector per se.

In order to illustrate the application of this invention, I have in the drawings shown a vehicle 10, which includes a conventional one-piece hood 11 and a conventional windshield 12. The deflector of this invention comprises a unit generally designated 13 which includes a pair of funnel-like housings 14 and an intermediate connecting bridge 15. Each of the housings is of hollow elbow-like construction including a conduit which opens in the direction of movement of the vehicle, the inlet end 16 of each housing being approximately three inches wide and the outlet end 17 approximately three-eighths of an inch in width, so that air passing through the housings will be compressed, prior to expulsion in front of the windshield, multiplying pressure of the air stream to effectively carry bugs, insects, etc. over the top of the vehicle, in addition to keeping the windshield free of snow and ice, while the vehicle is in motion.

The bridge 15 consists of an elongated arcuate plate, to conform to the aft walls of the housings 14, with which the plate is engaged. The plate is made with a plurality of openings 18 at each end of the plate, adapted for the reception of a bolt 19 or the like which passes through the openings 18 and complemental openings 20 formed in each housing, as illustrated to advantage in Fig. 4. The bolt 19 of each housing is selectively engageable through the openings of the plate 15 and housings 14 to permit lateral adjustment of the housings to conform to the width of the vehicle hood. The space between the proximate ends of the housings 14 forms a passageway for the air which blends with the air forced through the openings 17 of the housings.

The outer end of each of the housings 14 is provided with a headed stud 21, the shank of which has a spring wire clip 22 convoluted thereabout, the free terminals of the clip being of hooked formation, as indicated at 23, for engagement beneath the hood 11, as shown to advantage in Fig. 2. Each stud 21 may be connected to its housing in any suitable manner, such as by a threaded bolt 24 which extends through the stud and the end of the housing and engages a nut 25.

Interposed between the bottom of each housing 14 and the top of the hood 11 is a sponge rubber pad 26 which prevents contact of any part of the unit 13 with the hood. The sponge rubber pad is shaped to conform to the contour of the hood of the motor vehicle.

While experiments have proven that the device of the present invention as herein shown and described, is effective for preventing the crushing of bugs, insects, etc. against a motor vehicle windshield, while the vehicle is in motion, nevertheless I am aware that this device is also adapted to prevent the encrustation of ice and the retention of snow on the windshield, while the vehicle is in motion.

I am further aware that the device of the invention as herein shown and described, is susceptible of attachment to the front bumper of a motor vehicle to prevent the radiator from being clogged with bugs and insects.

This unit may be made of plastic or metal and is quickly engageable with any conventional type of motor vehicle using a one-piece hood, and moves as a unit with the hood when the latter is raised or lowered, and may be adjusted fore, aft and laterally.

While I have herein shown and described a preferred embodiment of my invention, it is nevertheless understood that various changes may be made therein, without departing from the spirit and scope of the claims hereto appended.

What I claim is:

1. A bug deflector for motor vehicles including a unit embodying a pair of housings connected by an intermediate bridge, the unit being superimposed on the motor vehicle hood fore of the windshield, the housings being adjustable on said bridge to conform to the width of the hood, the bridge complementing the aft ends of the housings with its upper margin terminating at the upper outlet ends of the housing to provide an unbroken stream of air completely across the vehicle hood in front of the windshield.

2. A bug deflector for motor vehicles including a unit embodying a pair of housings adapted to be superimposed on the motor vehicle hood fore of the windshield, each of said housings embodying a conduit extending through the housing and opening in the line of travel, the outlet end of the conduit being contracted and opening upwardly to produce a vertical compressed stream of air in front of the windshield, a bridge adjustably connected to adjacent terminals of said housing to permit lateral movement of the housing to conform to the width of the vehicle hood, the bridge complementing the aft ends of the housing, and a spring wire clip attached to the outer end of each housing, the free terminals of each clip being of hooked formation, for engagement beneath the hood.

References Cited in the file of this patent

UNITED STATES PATENTS

| | | |
|---|---|---|
| 1,995,574 | Metz | Mar. 26, 1935 |
| 2,220,715 | Heintz | Nov. 5, 1940 |
| 2,223,378 | Martin | Dec. 3, 1940 |
| 2,628,124 | Dietrich | Feb. 10, 1953 |
| 2,638,376 | Berry | May 12, 1953 |
| 2,816,796 | Saucerman | Dec. 17, 1957 |